(No Model.)  2 Sheets—Sheet 1.
G. WASHINGTON.
PETROLEUM INCANDESCENT LIGHTING.
No. 576,524. Patented Feb. 2, 1897.
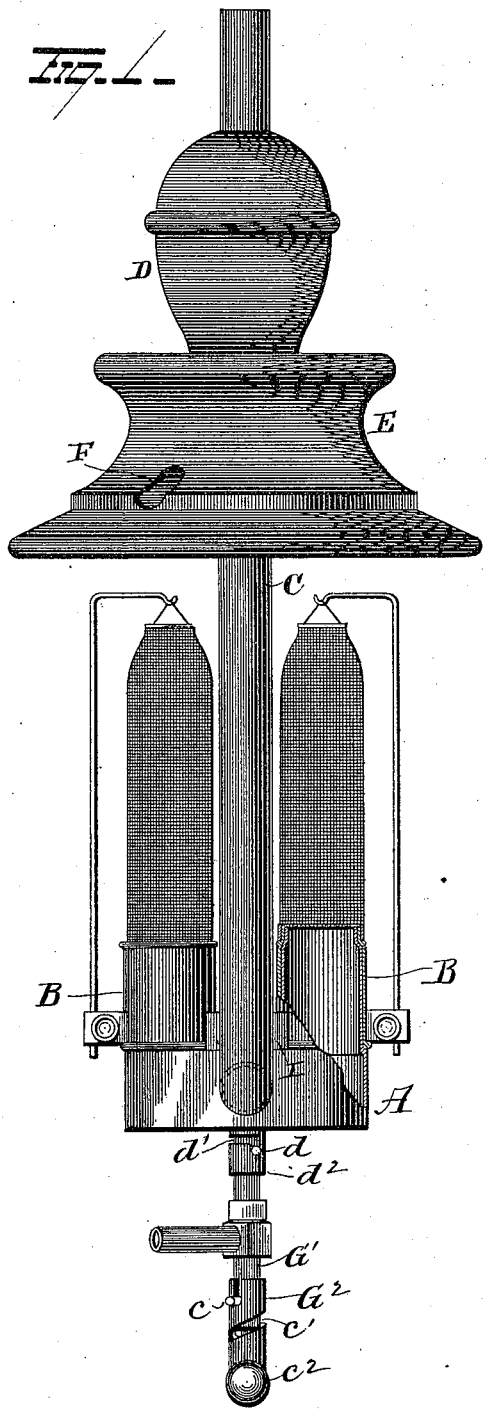
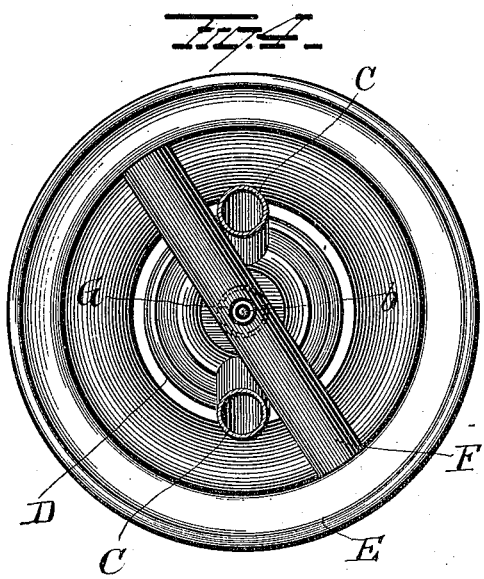
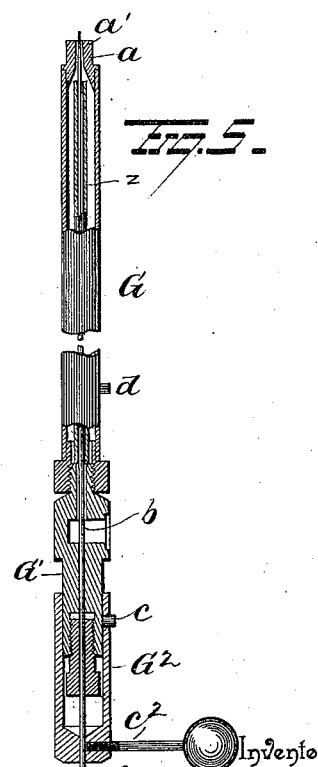
Witnesses
E. J. Nottingham
G. F. Downing.
Inventor
G. Washington
By H. A. Seymour
Attorney

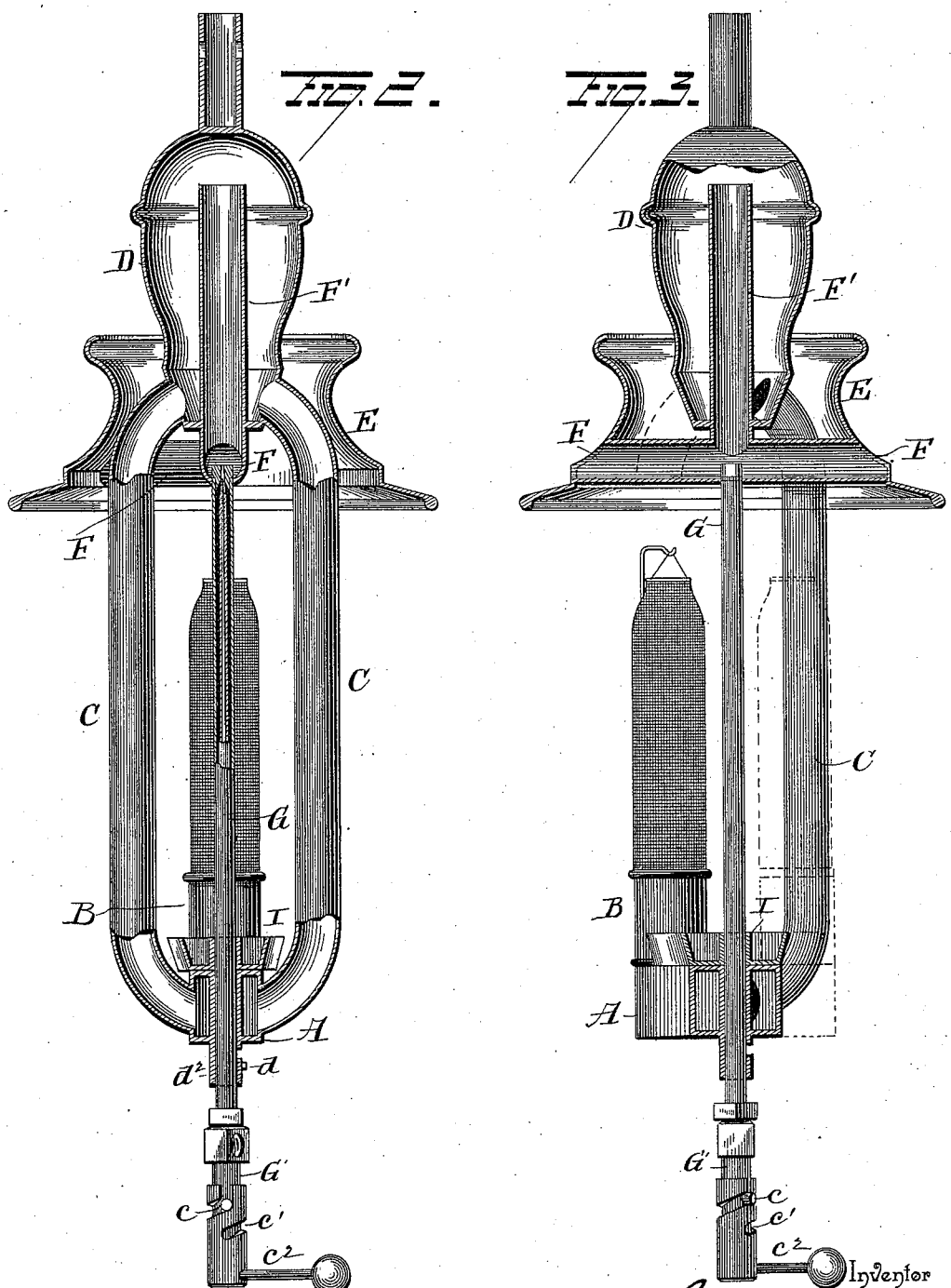

UNITED STATES PATENT OFFICE.

GEORGE WASHINGTON, OF BRUSSELS, BELGIUM.

PETROLEUM INCANDESCENT LIGHTING.

SPECIFICATION forming part of Letters Patent No. 576,524, dated February 2, 1897.

Application filed December 12, 1896. Serial No. 615,471. (No model.)

*To all whom it may concern:*

Be it known that I, GEORGE WASHINGTON, of Brussels, Kingdom of Belgium, have invented certain new and useful Improvements in Petroleum Incandescent Lighting; and I do hereby declare the following to be a full, clear, and exact description of the invention, such as will enable others skilled in the art to which it appertains to make and use the same.

My invention relates to an improvement in lamps; and it consists in an incandescent burner, a vaporizing-tube adjacent to the burner, a mixing-chamber for mixing air and vapor, and means for conveying the mixed air and vapor to the burner.

My invention further consists in an incandescent lamp for burning petroleum-vapor, provided with a removable vaporizing-tube.

My invention further consists in an incandescent lamp for burning petroleum-vapor, the combination, with a mixing-chamber, of a removable vaporizing-tube discharging the vapor into the mixing-chamber.

My invention further consists in an incandescent lamp for burning petroleum-vapor, the combination, with a mixing-chamber, of a removable vaporizing-tube discharging the vapor into the mixing-chamber, and a valve carried by the vaporizing-tube for cutting off and regulating the supply of vapor to the mixing-chamber.

My invention further consists in the parts and combinations of parts, as will be more fully described, and pointed out in the claims.

In the accompanying drawings, Figure 1 is a view of a lamp embodying my invention. Fig. 2 is a view in section through the tubes which convey the combined air and vapor to the burners. Fig. 3 is a sectional view through the induction-tubes. Fig. 4 is a view in section on line $x\,x$, Fig. 1, looking upward; and Fig. 5 is a view in section of the vaporizing-tube, stuffing-box, and sleeve.

A represents the base or burner of any suitable shape, provided with one or more, preferably a plurality, of burners B, which latter can be of any desired construction. This base A is in open communication with one or more tubes C, which latter extend upwardly and open into the mixing-chamber D. This mixing-chamber D constitutes the crown of the lamp, and is located in a central position over the burner or burners, and is designed for intimately mixing or commingling the vapor generated in the vaporizing-tube, to be hereinafter referred to, with air drawn into the mixing-chamber by the suction of the vapor.

In the drawings I have shown two tubes C, connecting the mixing-chamber and base A, these tubes being connected to the mixing-chamber near the lower end of the latter.

Surrounding the lower end of mixing-chamber D is the bell-shaped hood E, which latter is greater in diameter than the mixing-chamber and is arranged around same with its larger end downward, so as to direct the ascending current of hot air around and in close contact with the mixing-chamber. This hood is supported by the air-induction pipe F, which passes through the hood E, and is provided with an upwardly-extending branch F', passing through and secured to the bottom of the mixing-chamber D and terminating within the chamber near the upper end of the latter.

G is the vaporizing-tube, cylindrical throughout its entire length and extending from the base A up through an opening in pipe F immediately below the vertical branch F', so as to discharge the vapor into said latter pipe or branch. This tube is provided at its upper end with a screw-cap $a$, having a conical aperture $a'$ therein, through which passes the end of the needle-valve $b$. This needle-valve passes throughout the length of the tube G through the stuffing-box G', which latter is removably secured to and forms a continuation of the vaporizing-tube G and is secured to the sleeve $G^2$, movably mounted on the stuffing-box. Hence it will be seen that by moving the sleeve longitudinally the needle-valve is moved in the same direction, and as the conical end of the needle is designed to wholly or partly close the escape-orifice in the end of the tube the longitudinal movement of the needle operates to open or close more or less of the escape-aperture and thus regulate the amount of vapor discharged into the mixing-chamber. A small tube $z$, encircling the needle-valve, is located within the vaporizing-tube and serves to prevent the needle-valve from becoming bent or displaced, as it affords the needle-valve a lateral bearing in all directions throughout the length of the vaporizing-tube. This movement of the sleeve can be effected in various ways; but in the present instance I have shown the stuffing-box provided with a lug $c$, which latter rests in a spiral groove $c'$ in the sleeve, the groove being open at its inner end to permit it to be removed from the box. Hence by rotating the sleeve by means of the lever $c^2$ the sleeve is, by reason of its engagement with the lug, given a longitudinal movement and carries with it the needle-valve.

In the device as illustrated the lever $c^2$ is screwed into the sleeve and engages the needle-valve for locking the latter to the sleeve. The upper end of the vaporizing-tube fits snugly within the induction-tube F, while the lower end passes through the base A, the main portion of the tube being between burners and exposed to the heat thereof. This tube is, as before stated, straight throughout its length and is removably held in place by the lug $d$ thereon engaging the open inverted-L-shaped slot $d'$ in the sleeve $d^2$, depending from the base.

With this construction it will be seen that the vaporizing-tube can be instantly placed in position or removed from the lamp without the employment of tools or skilled labor, and hence can be readily removed for cleaning. By simply removing the cap and stuffing-box on the opposite ends of the tube any carbon that may be deposited on its inner face can be readily and quickly removed.

While I may attach an oil-reservoir to the lamp, I prefer to employ an independent reservoir remote from the lamp and convey the oil to the lamp by means of a tube or pipe, flexible or rigid, but in either event the oil will be admitted to the vaporizing-tube near the bottom thereof. In the present instance I have shown the stuffing-box provided with a screw-threaded opening for the attachment of a pipe which conducts oil to the tube from a reservoir located at a distance from the lamp. The oil may be fed by gravity or it may be forced from the reservoir by air-pressure.

Resting on the base A of the lamp between the burners is the oil or alcohol cup I. This cup is provided with a central sleeve for the passage of the vaporizing-tube, and is designed to contain sufficient alcohol or oil, which, when ignited, produces sufficient heat to vaporize the oil within the tube. The vapor thus generated rises in the tube and is discharged into the branch induction-pipe F', and acting as an injector draws in air through the pipes F. This air thus drawn in mixes with the vapor in pipe F', and is discharged therefrom against the top of the mixing-chamber. By this arrangement the vapor and air are intimately mixed, and passing downwardly are discharged into the base A and pass from thence to the burners, where it is ignited from the flame of the burning oil in the oil-cup or can be ignited in the ordinary manner. After the combined air and vapor issuing from the burners has been ignited, the heat therefrom vaporizes the oil in the vaporizer and a strong, steady, and safe light can be maintined as long as the oil-supply is continued.

The intensity of the light can be regulated by increasing and lessening the supply of vapor to the pipe F', and it can be extinguished by closing the orifice through which the vapor escapes to said pipe F', and it can also be extinguished by cutting off the supply of oil by a cock located in the oil-supply pipe.

It is evident that numerous slight changes might be made in the general arrangement and combinations of parts without departing from the spirit and scope of my invention, and hence I would have it understood that I do not limit myself to the precise details herein shown and described; but, Having fully described my invention, what I claim as new, and desire to secure by Letters Patent, is—

1. In a hydrocarbon incandescent lamp, the combination with a vaporizing tube or receptacle, a mixing-chamber for mixing air and vapor, and a pipe for conveying the mixed air and vapor to the burner, of an incandescent burner located at one side of and in close proximity to the vaporizing-tube, substantially as set forth.

2. In a hydrocarbon incandescent lamp, the combination with a vaporizing tube or receptacle, a mixing-chamber for mixing air and vapor, and a pipe for conveying the mixed air and vapor to the burner, of incandescent burners located on opposite sides of the vaporizing-tube and heating the same, substantially as set forth.

3. In a hydrocarbon incandescent lamp, the combination with a vaporizing tube or receptacle and a mixing-chamber for mixing air and vapor, of an incandescent burner (one or more) located below the mixing-chamber and at the side or sides of the vaporizing-tube and a pipe (one or more) for conveying mixed air and vapor from the mixing-chamber to the burner or burners, substantially as set forth.

4. In a hydrocarbon incandescent lamp, the combination with a vaporizing tube or receptacle and a mixing-chamber for mixing air and vapor, of an incandescent burner (one or more) located below the mixing-chamber and at the side or sides of the vaporizing-tube, of a pipe (one or more) extending from the mixing-chamber downwardly in close proximity to the burners and below the same, and adapted and arranged to convey mixed air and vapor from the mixing-chamber to the lower ends of the burners and to heat the mixture on its passage, substantially as set forth.

5. In a hydrocarbon incandescent lamp, the combination with a mixing-chamber, incandescent burner, and pipe for conveying mixed air and gas to the burner, of a vaporizing-tube located substantially parallel to the burner and constructed and adapted to be readily and separably removable from the lamp, substantially as set forth.

6. In a hydrocarbon incandescent lamp, the combination with a vaporizing-tube, mixing-chamber and an incandescent burner, of a hood located above the burner and adapted to convey heated air into contact with the mixing-chamber.

7. In a hydrocarbon incandescent lamp, the combination with a plurality of burners, a mixing-chamber located above the burners and receiving heat from the same, and pipes for conveying mixed air and vapor from the mixing-chamber to the lower ends of the burners, of a vaporizing-tube provided with a needle-valve for regulating the discharge of vaporized oil into the mixing-chamber, substantially as set forth.

8. In a hydrocarbon incandescent lamp, the combination with a hollow base, an incandescent burner connected therewith, of a mixing-chamber located over the burner, a pipe connecting the mixing-chamber and hollow base, and a readily-removable vaporizing-tube arranged in close proximity to the burner, substantially as set forth.

9. In a hydrocarbon incandescent lamp, the combination with a base, an incandescent burner connected therewith, and a mixing-chamber, of a vaporizing-tube detachably secured to the base by a bayonet-joint, substantially as set forth.

10. In a hydrocarbon incandescent lamp, the combination with a vaporizing-tube, provided with a stuffing-box, and a needle-valve extending throughout the length of the vaporizing-tube and through the stuffing-box, of a sleeve secured to the projecting end of the needle-valve, said sleeve being constructed and adapted to be adjustably secured to the stuffing-box, and thereby adjust the position of the needle-valve, substantially as set forth.

In testimony whereof I have signed this specification in the presence of two subscribing witnesses.

GEORGE WASHINGTON.

Witnesses:
R. D. ALLIGER,
HUBERT HOWSON.